United States Patent
Kimura

(10) Patent No.: US 8,787,462 B2
(45) Date of Patent: Jul. 22, 2014

(54) VIDEO SIGNAL PROCESSING APPARATUS AND VIDEO SIGNAL PROCESSING METHOD

(75) Inventor: Takushi Kimura, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 617 days.

(21) Appl. No.: 12/946,339

(22) Filed: Nov. 15, 2010

(65) Prior Publication Data

US 2011/0122951 A1 May 26, 2011

(30) Foreign Application Priority Data

Nov. 20, 2009 (JP) ................................. 2009-265335
Aug. 17, 2010 (JP) ................................. 2010-182554

(51) Int. Cl.
*H04N 11/02* (2006.01)
*H04N 11/04* (2006.01)
*H04N 7/18* (2006.01)

(52) U.S. Cl.
USPC ............ 375/240.16; 375/240.12; 375/240.13; 375/240.15

(58) Field of Classification Search
USPC ........................................ 375/240.16, 240.12
See application file for complete search history.

(56) References Cited

U.S. PATENT DOCUMENTS

| 2005/0179784 A1* | 8/2005 | Qi ............................. 348/208.1 |
| 2006/0215037 A1* | 9/2006 | Tsunekawa et al. ...... 348/211.99 |
| 2007/0133685 A1* | 6/2007 | Seong et al. ............. 375/240.16 |
| 2008/0231745 A1* | 9/2008 | Ogino et al. .................. 348/441 |

FOREIGN PATENT DOCUMENTS

| JP | 2006-304266 | 11/2006 |
| JP | 2008-236098 | 10/2008 |

* cited by examiner

*Primary Examiner* — Chikaodili E Anyikire
(74) *Attorney, Agent, or Firm* — Cowan, Liebowitz & Latman, P.C.

(57) ABSTRACT

A frame rate conversion apparatus compares a first frame image and a second frame image, detects a motion vector for each of blocks obtained by dividing a frame image into blocks, detects a scroll vector which indicates a uniform motion in an entire frame image based on the detected motion vector, and determines whether frame interpolation using the scroll vector is possible or not for each block in the first frame image, based on a correlation value in block matching of the block in the first frame image with an area obtained by shifting the block in the second frame image by an amount of the scroll vector, and a correlation value in block matching of the block in the first frame image with an area obtained by shifting the block in the second frame image by an amount of the motion vector.

14 Claims, 8 Drawing Sheets

FIG. 5A

| FREQUENCY OF FIRST MOTION Hx1 | FREQUENCY OF MOTION 0 Hx0 | HORIZONTAL COMPONENT OF SCROLL VECTOR Vscx |
|---|---|---|
| $\geq 40\%$ | $\leq 55\%$ | VECTOR OF FIRST MOTION Hxv |
| $\leq 15\%$ | $\geq 25\%$ | VECTOR OF MOTION 0 Hxv0 |
| OTHER THAN ABOVE CONDITIONS | | NONE |

FIG. 5B

| FREQUENCY OF FIRST MOTION Hy1 | FREQUENCY OF MOTION 0 Hy0 | HORIZONTAL COMPONENT OF SCROLL VECTOR Vscy |
|---|---|---|
| $\geq 40\%$ | $\leq 55\%$ | VECTOR OF FIRST MOTION Hyv |
| $\leq 15\%$ | $\geq 25\%$ | VECTOR OF MOTION 0 Hyv0 |
| OTHER THAN ABOVE CONDITIONS | | NONE |

VIDEO SIGNAL PROCESSING APPARATUS AND VIDEO SIGNAL PROCESSING METHOD

BACKGROUND OF THE INVENTION

1. Field of the Invention

The present invention relates to a video signal processing apparatus and control method for generating an image of intermediate frames, and converting a frame rate of video signals.

2. Description of the Related Art

As a frame rate conversion technology, there is a method for predicting motion of an image based on the continuous two frames of an image of input video signals, and generating an intermediate image between the two frames based on this motion vector, so as to increase the number of frames of the video signal. In this frame rate conversion, an interpolated image may fail if prediction of the motion is difficult because a plurality of motions or rotary motions are generated in the images, or repeat patterns are included, for example. However if the entire screen is moving in a similar way, the interpolated image hardly fails, so if such scenes are detected and uniformly interpolated, frame rate conversion with a high visual effect can be implemented.

Japanese Patent Application Laid-Open No. 2006-304266 discloses a method for detecting whether an image is in the pan/tilt state, determining a quantity of motion of the image if the image is in the pan/tilt state, and generating the interpolated image based on the quantity of motion. Japanese Patent Application Laid-Open No. 2008-236098 discloses a method for detecting whether detection vectors concentrate based on the histogram information that shows the appearance frequency of the detected motion vector, and performing interpolation using the motion vector when the vectors are concentrated.

SUMMARY OF THE INVENTION

However according to Japanese Patent Application Laid-Open No. 2006-304266, pan/tilt is detected based on the number of detection areas where reliability of the detected motion vector is high, and the number of areas within which a plurality of motions exist. Therefore a detection of pan/tilt can be missed in an image pattern in which the number of detection areas, where reliability is high, is less than a predetermined value. On the other hand, pan/tilt can be detected in error if a plurality of motions exist in an area other than an area where reliability is high.

According to Japanese Patent Application Laid-Open No. 2008-236098, it is determined whether dominant motion exists in a screen based on histogram information which represents the appearance frequency of each vector of the detected motion vectors, so that the scroll of the entire screen is detected. Hence in the case of an image which includes many areas where the detection of a motion vector is difficult, the frequency in the histogram does not become sufficiently high, and the scroll may not be able to be detected. Furthermore in the case of detecting the appearance frequency of each vector from a histogram, the number of categories in the histogram is enormous, so it is not easy to generate and analyze the histogram.

It is an object of the present invention to provide a technology which accurately detects the scroll (pan/tilt) scenes of a video image, and generates an interpolated image, even if an area, where detecting a motion vector is difficult, is included in the image.

To solve the above-described problem, the present invention provides a video signal processing apparatus having a motion vector detection unit configured to compare a first frame image and a second frame image, and detect a motion vector for each of a plurality of blocks obtained by dividing a frame image into blocks; a scroll vector detection unit configured to detect a scroll vector which indicates a uniform motion in an entire frame image based on the detected motion vector; and a determination unit configured to calculate, for each block in the first frame image, a difference between a correlation value in block matching of the block in the first frame image with an area obtained by shifting the block in the second frame image by an amount of the scroll vector, and a correlation value in block matching of the block in the first frame image with an area obtained by shifting the block in the second frame image by an amount of the motion vector of the block, and determine whether frame interpolation using the scroll vector is possible or not based on the calculation result.

According to the present invention, the detection accuracy of the scroll (pan/tilt) scenes can be improved and interpolated images can be generated, even if an area, where detecting a motion vector is difficult, is included in the image.

Further features of the present invention will become apparent from the following description of exemplary embodiments with reference to the attached drawings.

BRIEF DESCRIPTION OF THE DRAWINGS

FIG. 5A and FIG. 5B show scroll vector detector conditions;

DESCRIPTION OF THE EMBODIMENTS

Figure 1:
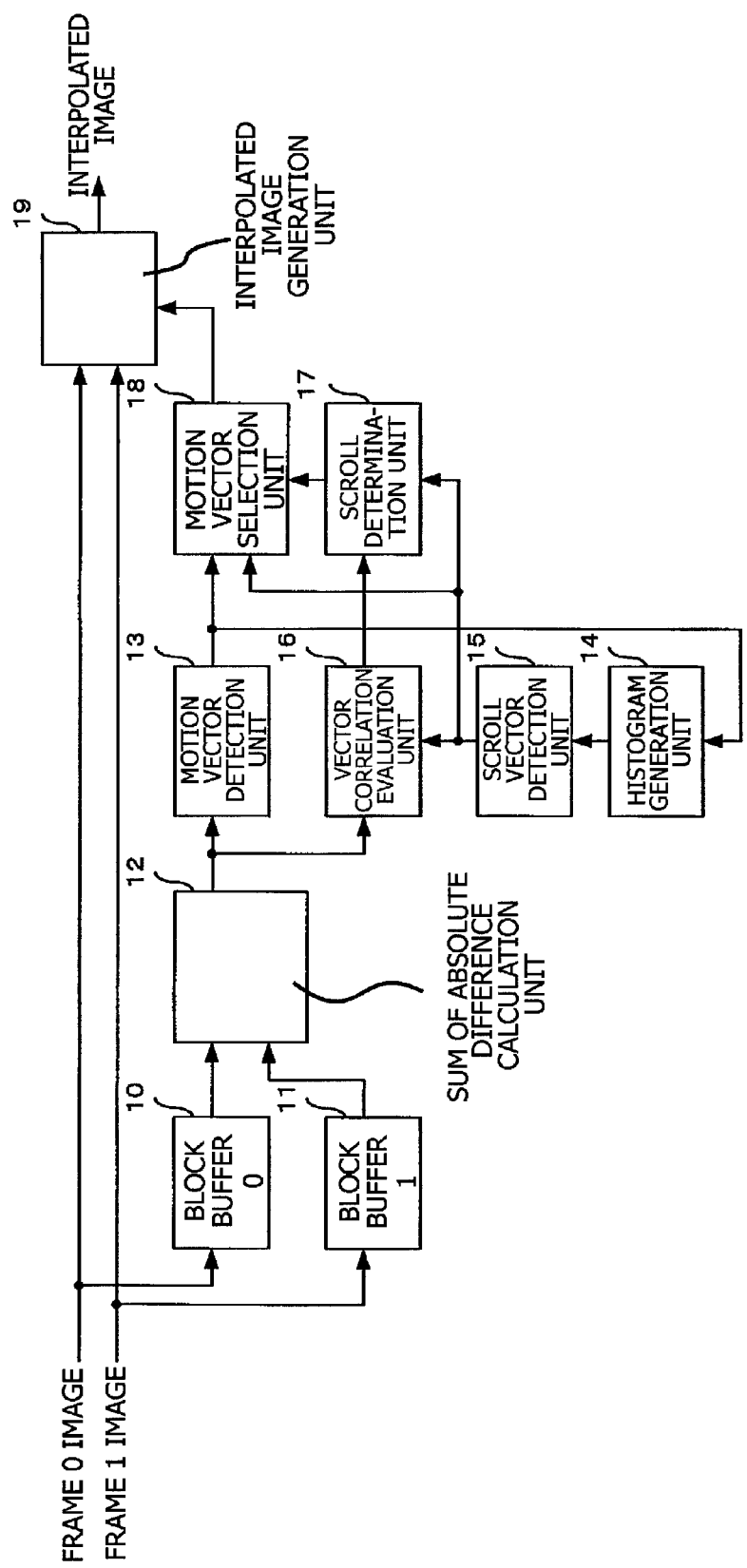
FIG. 1 is a block diagram depicting a general configuration of a frame rate conversion apparatus.

FIG. 1 is a block diagram depicting an embodiment of a frame rate conversion apparatus (video signal processing apparatus) according to the present invention. The frame rate conversion apparatus comprises a block buffer 10, block buffer 11, sum of absolute difference calculation unit 12, motion vector detection unit 13, histogram generation unit 14, scroll vector detection unit 15, vector correlation evaluation unit 16, scroll determination unit 17, motion vector selection unit 18 and interpolated image generation unit 19. This video signal processing apparatus predicts a motion vector by comparing a frame 0 image and frame 1 image which are input, and generates and outputs interpolated frame images between the frame 0 and frame 1 based on this motion vector.

[Block Buffer]

Figure 2A:
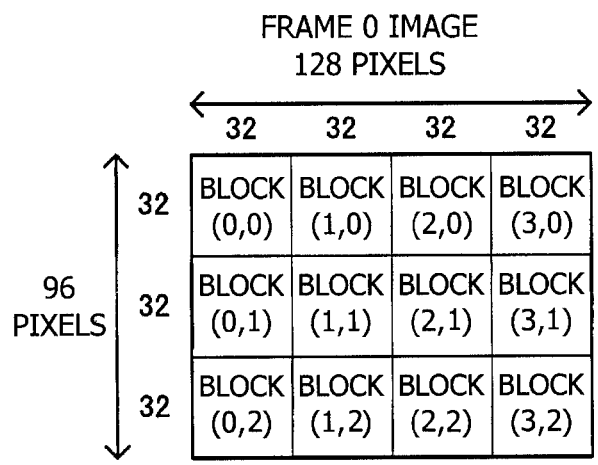
FIG. 2A is a diagram explaining an example of block division.

The block buffer 10 outputs image data which is a specific area extracted in blocks from the image of frame 0, as a vector detection unit. Hereafter this image data is called "block data 0". FIG. 2A is a diagram depicting an example of dividing a 128 dots×96 dots frame image into 12 32 dots×32 dots rectangular blocks. Needless to say, the sizes of the frame image and the block are not limited to this example, but can be any size. The block data 0 (BD0) which is output from the block buffer 10 is given by Expression (1) using the image data FD0 of the frame 0, block number (n, m), and horizontal coordinate i and vertical coordinate j.

[Expression 1]

$$BD0_{n,m}(i,j)=FD0(32\times n+i, 32\times m+j)\ n=0\sim3, m=0\sim2, i=0\sim31, j=0\sim31 \quad (1)$$

The block buffer 11 extracts data of an area having a same shape as the block data 0 from the image of the frame 1, and outputs it as block data 1. The block data 1 is extracted from the coordinates generated by shifting the coordinates of block data 0, and is sequentially output. For example, if the range of the size of the motion vector to be detected is horizontally ±24 dots and vertically ±15 dots, then the block data 1 is extracted from the coordinates generated by shifting the coordinates of the block data 0 by ±24 dots in the horizontal direction and ±15 dots shifted in the vertical direction, and is sequentially output. The block data 1 (BD1) is given by the following Expression (2) using the image data FD1 of the frame 1, block number (n, m), horizontal coordinate i, vertical coordinate j, shift amount is in the horizontal direction and shift amount js in the vertical direction.

[Expression 2]

$$BD1_{n,m}(i,j,is,js)=FD1(32\times n+i+is, 32\times m+j+js)\ n=0\sim3, m=0\sim2, i=0\sim31, j=0\sim31\ is=-24\sim24, js=15\sim15 \quad (2)$$

Figure 2B:
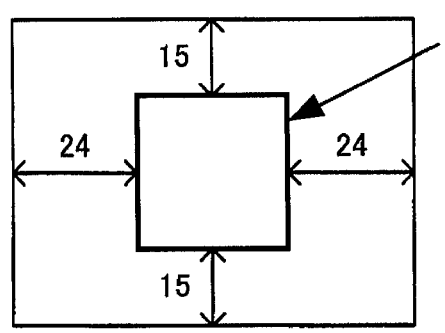
FIG. 2B is a diagram explaining an example of a search range of block matching.

FIG. 2B shows the relationship of the ranges of the block data 0 image and block data 1 image.

[Sum of Absolute Difference Calculation Unit]

The sum of absolute difference calculation unit 12 calculates the absolute difference between each corresponding dot based on the block data 0 and block data 1 which are input, and calculates the total in the block. The sum of absolute difference SAD (is, js) is given by the following Expression (3).

[Expression 3]

$$SAD_{n,m}(is, js) = \sum_{j=0}^{31}\sum_{i=0}^{31} |BD0_{n,m}(i, j) - BD1_{n,m}(i, j, is, js)| \quad (3)$$

Figure 3:
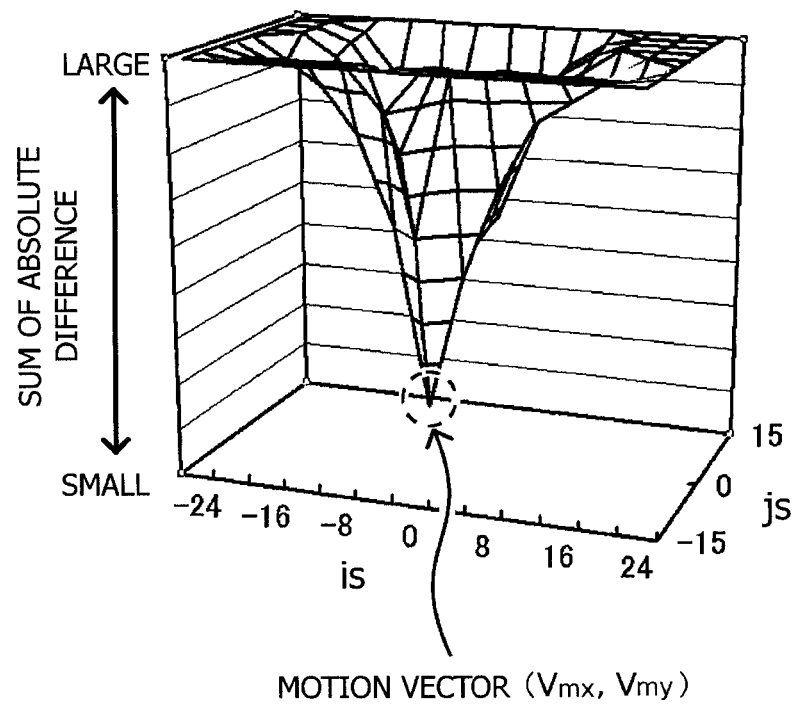
FIG. 3 is a diagram explaining an example of a distribution of the sum of absolute difference.

Here the shift amount (is, js) corresponds to the parameter which represents the motion vector. The sum of absolute difference SAD (is, js) shows a correlation value of each block (BD0) in the first frame image (FD0) with an area (BD1) obtained by shifting this block in the second frame image (FD1) by the shift amount (is, js). As the sum of absolute difference becomes smaller, correlation of the block matching becomes higher. FIG. 3 shows an example of the distribution of the sum of absolute difference with respect to the shift amount (is, js). The sum of absolute difference is an example of the correlation of block matching, and the correlation of block matching may be determined by such an evaluation function as the sum of square difference. As a value of the sum of absolute difference in FIG. 3, the minimum value is 0, and the maximum value is 32×32×256, for example.

The correlation (value) of block matching between a block in a first image and an area obtained by shifting this block by the vector amount (Vx, Vy) in a second frame image is simply called the "correlation (value) of the vector (Vx, Vy)" herein below. For example, such an expression as "correlation of the motion vector" or "correlation of the scroll vector" is used.

[Motion Vector Detection Unit]

The motion vector detection unit 13 detects a shift amount (is, js) with which the sum of absolute difference becomes the smallest as the motion vector (Vmx, Vmy). The motion vector detection unit 13 detects a motion vector for the plurality of blocks respectively.

[Histogram Generation Unit]

Figure 4A:
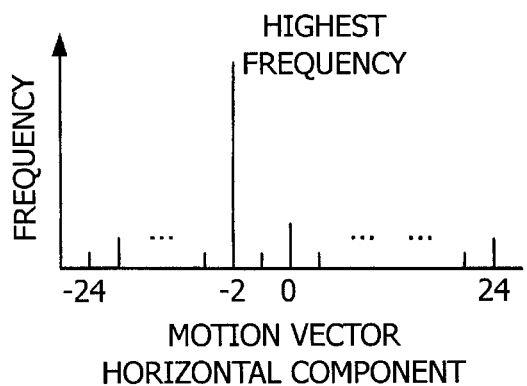
FIG. 4A and FIG. 4B show examples of histograms of a horizontal component and a vertical component of motion vectors respectively.
Figure 4B:
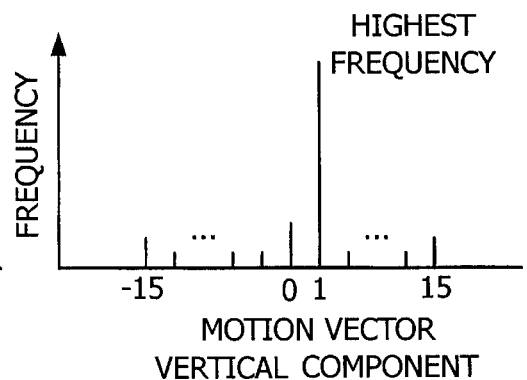

The histogram generation unit 14 generates a histogram of horizontal components and a histogram of vertical components of the motion vector, based on the motion vector information of each block detected within one frame. FIG. 4A and FIG. 4B show examples of the histogram.

[Scroll Vector Detection Unit]

The scroll vector detection unit 15 specifies a scroll vector (Vscx, Vscy) based on the distribution of the histogram obtained by the histogram generation unit 14. Here a scroll vector means a uniform motion in the entire frame image which was input. This is based on the assumption that a scroll vector is detected from video images which were taken while panning the camera in the horizontal direction, or while performing tilt control in the vertical direction, for example. The motion of the images does not always match with a detection point of a motion vector. Therefore it is preferable to use the following values as the frequency to be used for scroll vector detection. In other words, first it is assumed that the motion of which frequency is highest, out of the motions excluding the motion 0 and motion ±1, is Hxv, and this frequency is Hx. Then the greater one of the frequencies of the motion Hxv+1 and motion Hxv−1 is added to the frequency Hx, and this result is used as the frequency of the motion Hxv. Hereafter this frequency, after the addition, is referred to as "motion frequency Hx1". For example, in a case of a flat color image area with few characteristic points, such as a blue sky, the frequency of the motion 0 may become the highest, even if the image is taken while panning (scrolling) the camera in the horizontal direction. In order to detect a scroll vector even in such a case, the motion 0 and motion ±1, which are adjacent to the motion 0, are excluded from the detection target. If the peak of a histogram of a motion vector is not sufficiently high, it is preferable to add the frequency of the motion Hxv having the highest frequency and the frequency of the adjacent motion Hxv+1 or Hxv−1. This addition processing is not always required, and the frequency obtained from the histogram of the motion vector can be directly used.

Figure 4C:
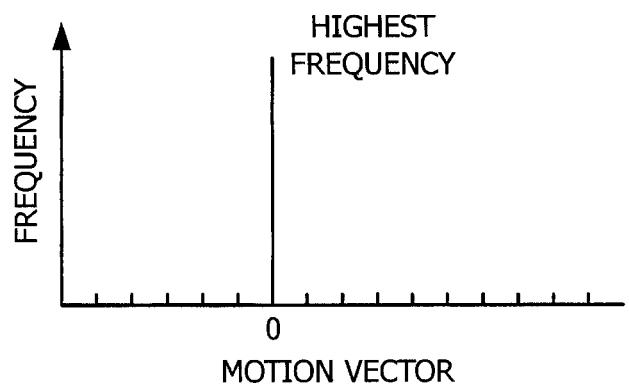
FIG. 4C shows an example of a histogram obtained from an image which has characteristic points on an entire screen.

This histogram shown in FIG. 4C is an example of a histogram which is obtained when a still image having characteristic points on the entire screen is scrolled. In this ideal state, the scroll vector can be easily estimated based on the peak at the highest frequency in the frequency distribution. Therefore the horizontal component Vscx of the scroll vector can basically be a motion having the highest frequency in the histogram of the horizontal components.

Figure 4D:
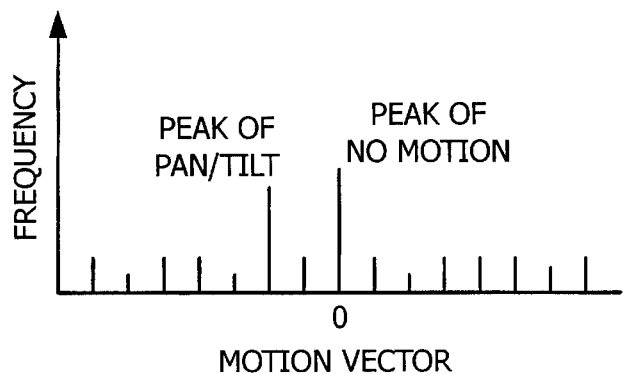
FIG. 4D shows an example of a histogram obtained from an image having few characteristic points.

However in the case of a flat color image area where characteristic points are few, such as a blue sky for example, the motion cannot be detected even in a scroll scene, so no motion or incorrect motion is detected as a scroll vector. In such an image, the frequency peak, which corresponds to the motion vector generated by pan/tilt becomes small, and a peak appears at the motion 0 at the same time, as shown in the histogram in FIG. 4D. Furthermore, if noise is also included in the image, motion vectors unrelated to the original motion are detected, which decreases the frequency peak which corresponds to the motion vector generated by pan/tilt. As a result, if the scroll vector is estimated based on only the highest peak, a detection error could occur. Therefore in the case of the frequency Hx0 of the motion 0 being the highest, it is preferable to detect the motion Hxv having the second highest frequency as the horizontal component Vscx of the scroll vector if the frequency Hx1 of the motion Hxv is sufficiently high (higher than a first threshold). The first threshold can be determined based on experiment, but is preferably about 33% or more (50% or less).

(Reference 1a) When Hx0>Hx1≥threshold 1, Hxv is the horizontal component of the scroll vector.

Considering that the frequency of the motion 0 is detected to be high, as mentioned above, in the case of the scroll scene which has no motion in the horizontal direction, the frequency of the motion 0 becomes highest, and the frequency of the motion of which frequency is the second highest becomes sufficiently low. Therefore if the second highest frequency is a second threshold or less (second threshold<first threshold) when the frequency of the motion 0 is the highest, it is preferable to detect the motion 0 as the horizontal component Vscx of the scroll vector. The second threshold can be determined based on experiment, but is preferably about 10 points (%) or more less than the first threshold.

(Reference 2) If Hx0>Hx1 and threshold 2≥Hx1, the motion 0 is the horizontal component of the scroll vector.

If the frequency of the motion Hxv is the highest, that is if the component which indicates the peak is not the motion 0, then this motion may be detected as the horizontal component of the scroll vector, without imposing other conditions. However in the case of a scroll scene, the scroll vector moves with dominance, so it is preferable to impose a condition that the frequency of the motion is a predetermined value or more, as a condition to detect a scroll vector.

(Reference 1b) If Hx1≥Hx0 and Hx1≥threshold 1', Hxv is the horizontal component of the scroll vector.

Here if threshold 1=threshold 1', (Reference 1a) and (Reference 1b) are integrated into the following (Reference 1), which makes determination simpler. Needless to say, threshold 1≠threshold 1' is acceptable.

(Reference 1) When Hx1≥threshold 1, Hxv is the horizontal component of the scroll vector.

If the frequency Hx0 of the motion 0 is the highest and the frequency Hx1 of the motion Hxv is the second threshold or less, it is preferable to further impose a condition that the frequency Hx0 is a third threshold or more (third threshold>second threshold).

(Reference 2') If Hx0≥threshold 3>threshold 2≥Hx1, the motion 0 is the horizontal component of the scroll vector.

If the motion 0 indicates the peak, and the second peak is the first threshold or more but the peak of the motion 0 is sufficiently high, the second peak does not always indicate the scroll vector. Therefore the following Reference 1', obtained by improving the Reference 1, may be used. A fourth threshold is a value greater than the first threshold.

(Reference 1') If Hx1≥threshold 1 and Hx0≤threshold 4, Hxv is the horizontal component of the scroll vector. Reference 1' however is not always required, and Reference 1 alone can implement a sufficient effect.

An example of a method for detecting the horizontal component Vscx of the scroll vector will now be described. FIG. 5A shows an example of the conditions to detect the horizontal component Vscx of the scroll vector. If the frequency Hx1 is 40% or more of the total frequency, for example, and the frequency Hx0 of the motion 0 is 55% or less of the total frequency, for example, the motion Hxv is regarded as the horizontal component Vscx of the scroll vector. If the above conditions are not satisfied, and the frequency Hx1 is 15% or less of the total frequency, for example, and the frequency Hx0 is 25% or more of the total frequency, for example, then the motion 0 is regarded as the horizontal component Vscx of the scroll vector. If the above conditions are not satisfied, then the horizontal component of the scroll vector is regarded as undetectable.

The conditions "Hx1≥40% and Hx0≤55%" correspond to the above mentioned (Reference 1'). The first threshold is 40% and the fourth threshold is 55%. However it is also preferable to set only the condition "Hx1≥40%" using (Reference 1) instead of (Reference 1').

The conditions "Hx1≤15% and Hx0≥25%" correspond to the above mentioned (Reference 2'). The second threshold is 15% and the third threshold is 25%. However it is also preferable to set only the condition "Hx0>15%≥Hx1" using (Reference 2) instead of (Reference 2').

The vertical component of the scroll vector is also detected based on the same reference as the case of the horizontal component. FIG. 5B shows an example of the conditions to detect the vertical component of the scroll vector. Here Hy1 indicates the frequency of the motion Hyv after adjustment, just like the case of the horizontal component. In other words, it is assumed that the motion which most frequently occurs, out of the motions in the vertical direction excluding the motion 0 and motion ±1, is Hyv, and the frequency thereof is Hy, and the motion obtained by adding the greater one of the frequencies of the motion Hyv+1 and the motion Hyv−1 to the frequency Hy is Hy1. Here the same references (thresholds) are used for the horizontal component and the vertical component of the scroll vector, but the thresholds need not always be the same. It is also preferable that the thresholds are changed according to the range of the possible values of the horizontal component and the vertical component.

When both the horizontal component Vscx and the vertical component Vscy of the scroll vector are detected, the scroll flag, which indicates that the scroll vector was detected, and the scroll vector (Vscx, Vscy) itself are output from the scroll vector detection unit 15. If the horizontal component Vscx or the vertical component Vscy is not detected, on the other hand, the scroll vector is not detected.

In the present embodiment, a scroll vector is detected from the peak when the motion exists and the peak when no motion exists based on the above mentioned criteria. Therefore a scroll vector can be detected accurately even if an area where a motion vector cannot be detected and noises are included in the image. In the present embodiment, methods using four thresholds (see FIG. 5A, FIG. 5B) are used as an example of the criteria. This method has an advantage that sufficient accuracy can be obtained even if the expression for determination is simple, but various conditional expressions may be used within a scope that does not depart from the spirit of the criteria.

[Vector Correction Evaluation Unit]

The vector correlation evaluation unit 16 calculates, sequentially for each block, the difference of a correlation value SAD (Vscx, Vscy) of the scroll vector (Vscx, Vscy) and a correlation value SAD (Vmx, Vmy) of the motion vector of the block. If this difference is within a predetermined value (e.g. a predetermined value in 1024 to 10240 range), the vector correlation evaluation unit 16 determines that this block is a block which can be interpolated by the scroll vector, and outputs an interpolation possible flag.

Figure 6A:
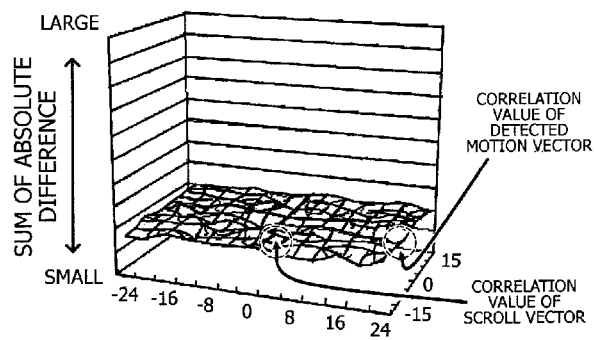
FIG. 6A is a diagram depicting a distribution of correlation values obtained by block matching from an image having few characteristic points.
Figure 6B:
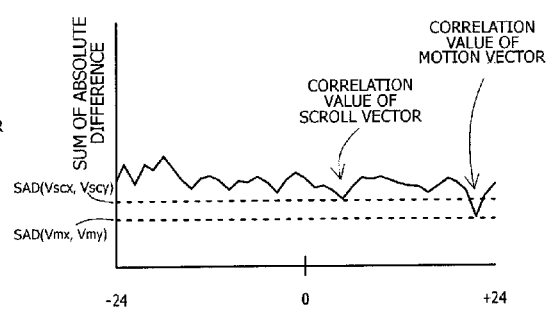
FIG. 6B is a diagram generated by converting FIG. 6A into two dimensions.

FIG. 6A shows an example of the distribution of correlation values obtained by block matching in a flat color image area where characteristic points are few, such as a blue sky. FIG. 6B shows a diagram obtained by converting the three-dimensional distribution of the correlation values in FIG. 6A into two dimensions. In the case of a flat color image area where characteristic points are few, correlation values become similar in any motion, and a motion of a position, where a correlation value happens to be the highest due to the influence of noise, for example, is detected as a motion vector. However the difference between the correlation value SAD (Vscx, Vscy) of the scroll vector and the correlation value SAD (Vmx, Vmy) of the motion vector is small, so the vector correlation evaluation unit 16 can determine this block as a block that can be interpolated by the scroll vector. Here it is assumed that a scroll vector is detectable from a frame image. In other words, it is assumed that correlation values are distributed as shown in FIG. 6A in a certain area of an image, while correlation values are distributed as shown in FIG. 3 in some other areas.

Figure 6C:
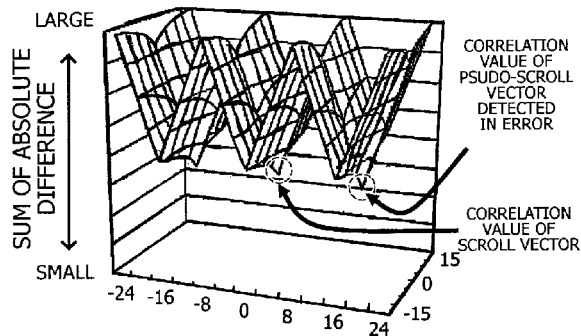
FIG. 6C is a diagram depicting a distribution of correlation values obtained by block matching from an image which includes a repeat pattern.
Figure 6D:
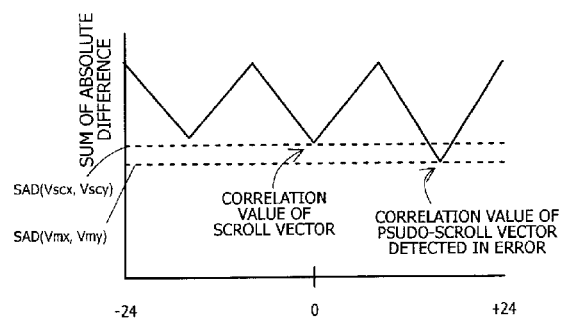
FIG. 6D is a diagram generated by converting FIG. 6C into two dimensions.

FIG. 6C shows an example of the distribution of correlation values obtained in block matching in an image area which includes such repeat patterns as stripes. FIG. 6D shows a diagram obtained by converting the three-dimensional distribution of the correlation values in FIG. 6C into two dimensions. In the case of an image area which includes a repeat pattern, a motion with high correlation value appears cyclically, so a correlation value of a motion that is different from an original motion may become the highest, and an incorrect motion vector tends to be detected easily. However in this case as well, the difference between the correlation value SAD (Vscx, Vscy) of the scroll vector and the correlation value SAD (Vmx, Vmy) of the motion vector becomes small, so the vector correlation evaluation unit 16 can determine this block as a block that can be interpolated by the scroll vector. Here it is assumed that a scroll vector is detectable from a frame image. In other words, it is assumed that correlation values are distributed as shown in FIG. 6C in a certain area of an image, while correlation values are distributed as shown in FIG. 3 in some other areas.

[Scroll Determination Unit]

The scroll determination unit 17 counts the number of interpolation possible flags, which are sequentially output from the vector correlation evaluation unit 16 for each block, for the entire one frame of the image. If the ratio of the count value to the total number of blocks is greater than or equal to a predetermined ratio (e.g. a predetermined value in 90 to 95% range) and the scroll flag is output from the scroll vector detection unit 15, then the scroll determination unit 17 determines that the video image which was input is a scroll scene.

[Motion Vector Selection Unit]

When the scroll determination unit 17 determines that the input video image is a scroll scene, the motion vector selection unit 18 outputs the scroll vector (Vscx, Vscy) detected by the scroll vector detection unit 15 as the interpolation vector (Vx, Vy). If the scroll determination unit 17 did not determine the image as a scroll scene, the motion vector (Vmx, Vmy) detected by the motion vector detection unit 13 is output as the interpolated vector (Vx, Vy).

[Interpolated Image Generation Unit]

Figure 7:
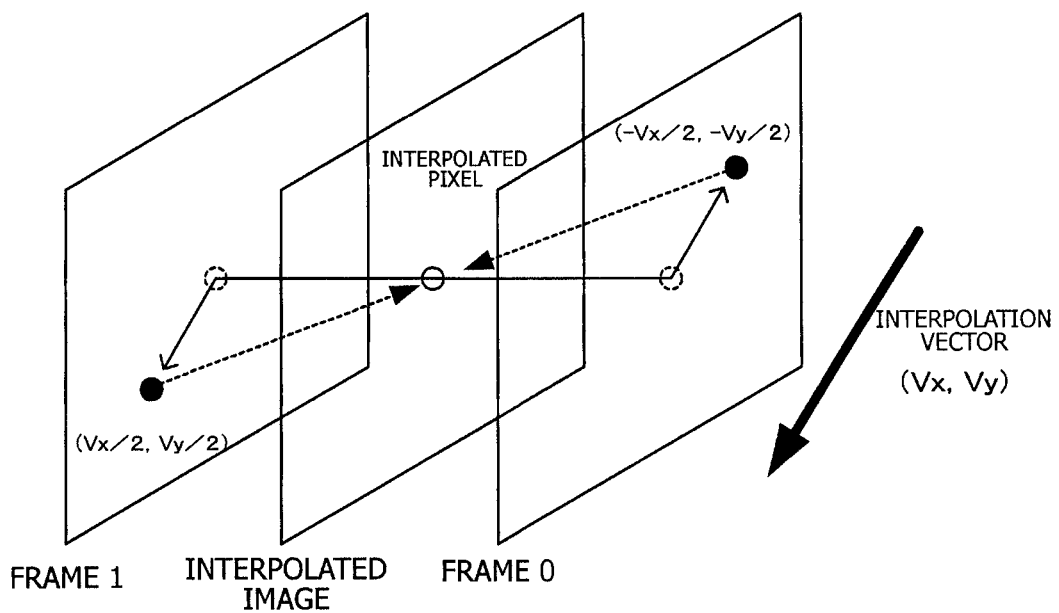
FIG. 7 is a diagram explaining an example of interpolation based on motion vectors.

The interpolated image generation unit 19 generates and outputs an interpolated image from the frame 0 image and frame 1 image based on the interpolated vector (Vx, Vy) which is input from the motion vector selection unit 18. As, for example, shown in FIG. 7, the interpolated image is generated by calculating a mean value of the pixel in the relative position (−Vx/2, −Vy/2) of the frame 0 and the pixel in the relative position (Vx/2, Vy/2) of the frame 1 for the interpolated pixel when the interpolated vector is (Vx, Vy). Thus in a scroll scene (the case when interpolation using a scroll vector is determined to be possible), an interpolated image is generated using the scroll vector as the interpolated vector. If the image is not a scroll scene (the case when interpolation using the scroll vector is determined to be impossible), an interpolated image is generated using the motion vector as the interpolated vector.

<Processing Flow>

Figure 8:
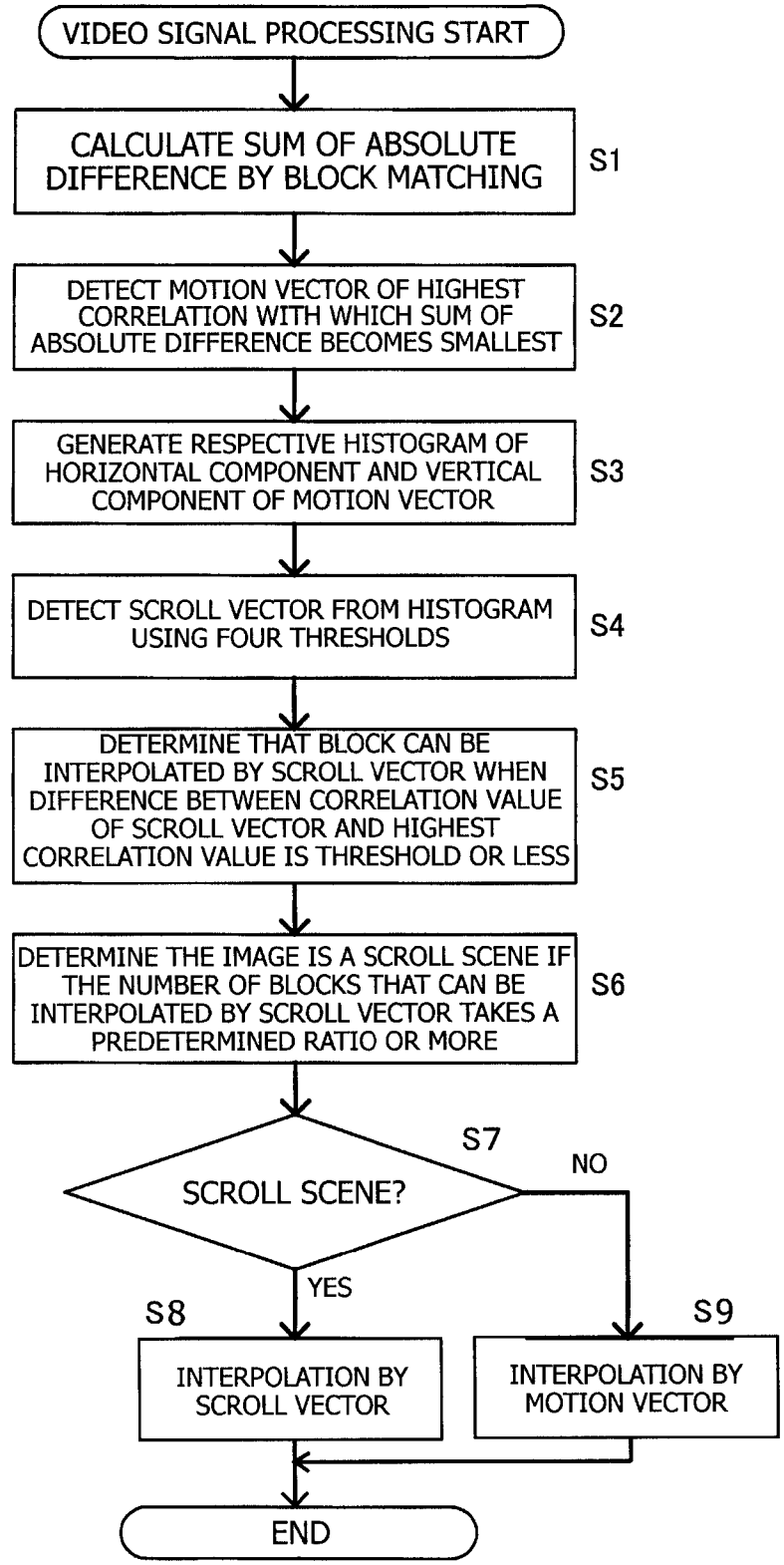
FIG. 8 is a flow chart depicting the frame rate conversion processing.

Now the video signal processing of the video signal processing apparatus having the function configuration in FIG. 1 will be described with reference to the flow chart in FIG. 8.

In step S1, the sum of absolute difference calculation unit 12 calculates the sum of absolute difference (correlation value) by block matching. For one block image 0, the sum of absolute difference with a block image 1 in a range shown in FIG. 2B is calculated. In step S2, the motion vector detection unit 13 detects a motion, with which the sum of absolute difference becomes smallest (correlation is greatest), as a motion vector.

In step S3, the histogram generation unit 14 generates a respective histogram of the horizontal component and the vertical component of the detected vector. In step S4, the scroll vector detection unit detects the scroll vector based on the histogram according to the criteria shown in FIGS. 5A and 5B.

In step S5, if the difference between the correlation value of the scroll vector obtained in the block matching and the correlation value of the motion vector is a threshold or less, the vector correlation evaluation unit 16 determines the block as a block that can be interpolated by the scroll vector. In step S6, if the ratio of blocks for which the vector correlation evaluation unit 16 determined as interpolation possible is a predetermined ratio or more, the scroll determination 17 determines this image as a scroll scene. In step S7, if it is detected that the image is a scroll scene, the interpolated image generation unit 19 executes interpolation based on the scroll vector (step S8), and if it is detected that the image is not a scroll scene, the interpolated image generation unit 19 executes interpolation based on the detected motion vector (step S9).

<Function and Effect of this Embodiment>

According to this embodiment, after a scroll vector, indicating a uniform motion on the entire video image, is detected, it is verified whether this image is a scroll scene or not based on the difference between the correlation value of the scroll vector in block matching and the correlation value of the motion vector in block matching. Even if an incorrect scroll vector is detected, whether the generation of an interpolated image, using the detected scroll vector, is possible (appropriate) or not can be determined by this verification, and the generation of an interpolated image based on the scroll vector detected in error can be prevented.

The scroll vector is detected based on the respective histogram of the horizontal component and the vertical component of the motion vector. In the case of using the histogram of the vector itself, the number of categories becomes enormous, and it is not easy to generated or analyze the histogram. According to the present embodiment, the histogram is determined for each component, so it is easy to generate and analyze the histogram.

A component which indicates a peak is not simply detected as a scroll vector, but in the case when the motion 0 indicates a peak, the motion which indicates the second peak is detected as a scroll vector if the second peak is high enough. If the motion 0 indicates a peak and the second peak is sufficiently small, then the motion 0 is detected as a scroll vector. By using such a reference, the scroll vector can be accurately detected even in a flat color image area where characteristic points are few or an image including an image area where detection of a motion vector is different. Further, according to the present embodiment, the above criteria is implemented by two conditional expressions using four thresholds, therefore processing is simple.

<Variant Form>

The scroll determination unit verifies whether it is appropriate to generate an interpolated image by a scroll vector, so a component which indicates a peak may be simply detected as a component of the scroll vector, without using the reference described in the present embodiment. This is because even if an incorrect motion is detected as a scroll vector, it is determined that this motion is not a scroll vector in the verification by the scroll determination unit, and frame interpolation is executed based on the motion vector. However it is effective to detect a scroll vector accurately as the present embodiment, since an opportunity to apply uniform interpolation based on the scroll vector increases.

The criteria used for the above description are just examples, and can be modified within a scope that does not depart from the spirit of the invention. One key point of the criteria is to consider that motion 0 could be detected more frequently than an actual number. In other words, even if the motion 0 indicates a peak, the second peak may be detected as a scroll vector. Another key point of criteria is to detect the dominant motion as a scroll vector. In the above description, a lower limit value is set in the frequency, but a condition that a difference between the frequency of the peak and the frequency of the second peak is a predetermined value or more may be set.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s).

This application claims the benefit of Japanese Patent Application No. 2009-265335, filed on Nov. 20, 2009, and Japanese Patent Application No. 2010-182554, filed on Aug. 17, 2010, which are hereby incorporated by reference herein in their entirety.

What is claimed is:

1. A video signal processing apparatus comprising:
   a motion vector detection unit configured to compare a first frame image and a second frame image, and detect a motion vector or each of a plurality of blocks obtained by dividing a frame image into blocks;
   a scroll vector detection unit configured to detect a scroll vector which indicates a uniform motion in an entire frame image based on the detected motion vector;
   a determination unit configured to calculate, for each block in the first frame image, a difference between a correlation value in block matching of the block in the first frame image with an area obtained by shifting the block in the second frame image by an amount of the scroll vector, and a correlation value in block matching of the block in the first frame image with an area obtained by shifting the block in the, second, frame image by an amount of the motion vector of the block, and determine whether frame interpolation using the scroll vector is possible, or not based on the calculation result; and
   a frame interpolation unit configured to generate an interpolated frame using the scroll vector which indicates a uniform motion in the entire frame image when the determination unit determines that the frame interpolation using the scroll vector is possible, and generate the interpolated frame using the motion vector detected for each of a plurality of blocks by the motion vector detection unit when the determination unit determines that the frame interpolation using the scroll vector is impossible.

2. The video signal processing apparatus according to claim 1, wherein the determination unit determines that frame interpolation using the scroll vector is possible when the number of blocks, exhibiting a difference of the correlation values within a predetermined value, exists at a predetermined ratio or more.

3. The video apparatus according to claim 1, wherein the scroll vector detection unit generates a histogram of the detected motion vector, and detects, a scroll vector which indicates a uniform motion in the entire frame image, based on a peak of the generated histogram.

4. The video signal processing apparatus according to claim 3 wherein the scroll vector detection unit generates a histogram of a horizontal component and a histogram of a vertical component of the detected motion vector, specifies a peak of the generated histogram of the horizontal component and a peak of the generated histogram of the vertical component and detects a scroll sector which indicates a uniform motion in the entire frame image bused on the specified peaks.

5. The video signal processing apparatus according to claim 4, wherein when a component which indicates a peak in the histogram of the horizontal component or the vertical component is not the motion 0, the scroll vector detection unit detects the component which indicates the peak as a horizontal component or a vertical component of the scroll vector, and
   when the component which indicates a peak in the histogram of the horizontal component or the vertical component is the motion 0, the scroll vector detection unit detects a component which indicates a second highest peak as the horizontal component or the vertical component of the scroll vector if the frequency of the component which indicates the second peak is greater than or equal to a first threshold, and detects the motion 0 as the horizontal component or the vertical component of the scroll vector if the frequency of the component which indicates the second peak is smaller than or equal to a second threshold, which is smaller than the first threshold, and
   the scroll vector detection unit does nor detect the scroll vector if the above conditions are not satisfied.

6. The video signal processing apparatus according, to claim 5, wherein
   when the component which indicates a peak in the histogram of the horizontal component or the vertical component is not the motion 0, the scroll vector detection unit does not detect the component which indicates the peak as the horizontal component or the vertical component of the scroll vector if the frequency of the component which indicates the peak is smaller than the first threshold, when the component which indicates the peak in the histogram of the horizontal component or the vertical component is the motion 0, and the frequency of the component which indicates the second peak is smaller than or equal to a second threshold, the scroll vector detection unit does not detect the component which indicates the peak as the horizontal component or the if the frequency of the component of the motion 0 is smaller than a third threshold, when the component which indicates the peak iii the histogram of the horizontal component or the vertical component is the motion 0, and the frequency of the component which indicates the second highest peak is greater than or equal to the first threshold, the scroll vector detection unit does not detect the component which indicates the peak as the horizontal component or vertical component of the scroll vector if the frequency of the component of the motion 0 is greater than a fourth threshold, the third threshold is greater than the second threshold, and the fourth threshold is greater than the first threshold.

7. The video signal processing apparatus according to claim 1, wherein when the scroll vector detection unit does not detect a scroll vector, the determination unit determines: that the frame interpolation using the scroll vector is impossible.

8. A video signal processing method for a video signal processing apparatus which generates an interpolated frame between a rust frame image and a second frame image, the method comprising:
  a motion vector detection step of comparing the first frame image and the second frame image, and detecting a motion vector for each of a plurality of blocks obtained by dividing a frame image into blocks;
  a scroll vector detection step of detecting. a scroll vector which indicates a uniform motion in an entire frame image based on the detected motion rector;
  a determination step of calculating, for each block in the first frame image a difference between a correlation value in block matching of the block in the first frame image with an area obtained by shifting the block in the second frame image by an amount of the scroll vector, and a correlation value in block matching of the block in the first frame image with an area obtained by shifting the block in the second frame image by an amount of the motion vector of the block, and determining whether frame interpolation using the scroll vector is possible or not based on the calculation result; and
  a frame interpolation step of generating an interpolated frame using the scroll vector which indicates a uniform motion in the entire frame image when it is determined in the determination step that the frame interpolation the scroll vector is possible, and generating an interpolated frame using the motion sector detected for each of a plurality of blocks in the motion vector detection step when it is determined that the frame interpolation using the scroll vector is impossible.

9. The video signal processing method for a video signal processing apparatus according to claim 8, wherein
  in the determination step, is determined that frame interpolation using the scroll vector is possible when the number of blocks, exhibiting a difference of the correlation values within a predetermined value, exists at a predetermined ratio or more.

10. The video signal processing method for a video signal processing apparatus according to claim 8, wherein
  in the scroll vector detection step, a histogram of the detected motion vector is generated, and a scroll vector which indicates a uniform motion in the entire frame image is detected based on a peak of the generated histogram.

11. The video signal processing method for a video signal processing apparatus according to claim 10, wherein
  in the scroll vector detection step, a histogram of a horizontal component and a histogram of a vertical component of the detected motion vector is generated, a peak of the generated histogram of the horizontal component and a peak of the generated histogram of the vertical component are specified; and a scroll vector which indicates a uniform motion in the entire frame image is detected based on the specified peaks.

12. The video signal processing method for a video signal processing apparatus according to claim 11, wherein
  in the scroll vector detection step,
    when a component which indicates a peak in the histogram of the horizontal component or the vertical component is not the motion 0, the component which indicates the peak is detected as a horizontal component or a vertical component or the scroll vector, and
    when the component which indicates a peak in the histogram of the horizontal component or the vertical component is the motion 0, a component which indicates a second highest peak is detected as the horizontal component or the vertical component of the scroll vector if the frequency of the component which indicates the second peak is greater than or equal to a first threshold, and the motion 0 is detected as the horizontal component or the vertical component of the scroll vector if the frequency of the component which indicates the second peak is smaller than or equal to a second threshold, which is smaller than the first threshold, and
    the scroll vector is not detected if the above, conditions are not satisfied.

13. The video signal processing method for a video signal processing apparatus according to claim 12, wherein
  in the scroll vector detection step,
    when the component which indicates a peak in the histogram of the horizontal component or the vertical component is not the motion 0, the component which indicates the peak is not detected as thy horizontal component or the vertical component of the scroll vector if the frequency of the component which indicates the peak is smaller than the first threshold,
    when the component which indicates the peak in the histogram of the horizontal component or vertical component is the motion 0, and the frequency of the component which indicates the second peak is smaller than or equal to a second threshold, the component which indicates the peak is not detected as the horizontal component or the vertical component if the frequency of the component of the motion 0 is smaller than a third threshold,
    when the component which indicates the peak in the histogram of the horizontal component or the vertical component is the motion 0, and the frequency of the component which indicates the second highest peak is greater than or equal to the first threshold, the component which indicates the peak is not detected as the horizontal component or vertical component of the scroll vector if the frequency of the component of the motion 0 is greater than a fourth threshold, the third threshold is greater than the second threshold, and the fourth threshold is greater than the firs threshold.

14. The video signal processing method for a video signal processing apparatus according to claim 8, wherein when a scroll vector is not detected in the scroll vector detection step, it is determined that the frame interpolation using the scroll vector is impossible in the determination step.

\* \* \* \* \*